(12) United States Patent
Kurfirst

(10) Patent No.: US 12,487,360 B2
(45) Date of Patent: Dec. 2, 2025

(54) SYSTEMS AND METHODS FOR USING AN ACCESSIBILITY HEADSET SYSTEM FOR PROVIDING DIRECTIONS TO AUDIO AND VISUALLY IMPAIRED USERS

(71) Applicant: CVS Pharmacy, Inc., Woonsocket, RI (US)

(72) Inventor: Dwayne Kurfirst, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 738 days.

(21) Appl. No.: 17/953,270

(22) Filed: Sep. 26, 2022

(65) Prior Publication Data

US 2024/0103172 A1     Mar. 28, 2024

(51) Int. Cl.
*G01S 17/88*     (2006.01)
*G01J 1/42*     (2006.01)
(Continued)

(52) U.S. Cl.
CPC .............. *G01S 17/88* (2013.01); *G01J 1/4204* (2013.01); *G01S 15/88* (2013.01); *G01S 17/86* (2020.01);
(Continued)

(58) Field of Classification Search
CPC ................................. G01S 17/88; G01S 17/86
See application file for complete search history.

(56) References Cited

U.S. PATENT DOCUMENTS

| 7,072,476 B2 | 7/2006 | White et al. |
| 8,123,660 B2 | 2/2012 | Kruse et al. |

(Continued)

FOREIGN PATENT DOCUMENTS

| CN | 116897333 A | * | 10/2023 | ........... G09B 21/003 |
| DE | 102023101326 A1 | * | 2/2024 | ........... G06V 10/764 |

(Continued)

OTHER PUBLICATIONS

Bouteraa, Yassine "Design and Development of a Wearable Assistive Device Integrating a Fuzzy Decision Support System for Blind and Visually Impaired People," *Micromachines*, vol. 12 (Sep. 7, 2021).

*Primary Examiner* — Christopher P Ellis
(74) *Attorney, Agent, or Firm* — Leydig, Voit & Mayer, Ltd.

(57) ABSTRACT

In some instances, an accessibility headset for visually impaired or hearing impaired users is provided. The accessibility headset comprises one or more light detection and ranging (LIDAR) devices configured to obtain LIDAR measurements; one or more infrared (IR) sensors configured to obtain IR feedback from one or more products; an output system comprising: one or more haptic devices configured to provide haptic feedback to a user; and a second output device configured to provide alternative feedback to the user; and a processor. The processor is configured to: determine a set of navigation instructions to direct the user to a first product by avoiding one or more first obstacles and provide, to the user, one or more first instructions from the set of navigation instructions using an output system based on an indication of whether the user is visually impaired or hearing impaired.

20 Claims, 7 Drawing Sheets

(51) Int. Cl.
  *G01S 15/88*  (2006.01)
  *G01S 17/86*  (2020.01)
  *G02B 27/01*  (2006.01)
  *G06F 3/01*   (2006.01)
  *G06F 3/16*   (2006.01)
  *G06V 40/20*  (2022.01)
  *G09B 21/00*  (2006.01)
  *G10L 15/22*  (2006.01)
  *H04R 1/10*   (2006.01)

(52) U.S. Cl.
  CPC ........... *G02B 27/017* (2013.01); *G06F 3/016* (2013.01); *G06F 3/167* (2013.01); *G06V 40/28* (2022.01); *G09B 21/003* (2013.01); *G09B 21/006* (2013.01); *G09B 21/009* (2013.01); *G10L 15/22* (2013.01); *H04R 1/1091* (2013.01); *H04R 2460/13* (2013.01)

(56) References Cited

U.S. PATENT DOCUMENTS

| | | |
|---|---|---|
| 9,576,460 B2 | 2/2017 | Dayal |
| 9,578,307 B2 | 2/2017 | Moore et al. |
| 9,922,236 B2 | 3/2018 | Moore et al. |
| 10,024,667 B2 | 7/2018 | Moore et al. |
| 12,191,035 B1 * | 1/2025 | Pala ................. G16H 50/20 |
| 2005/0208457 A1 | 9/2005 | Fink et al. |
| 2010/0241350 A1 | 9/2010 | Cioffi et al. |
| 2011/0018903 A1 | 1/2011 | Lapstun et al. |
| 2012/0092460 A1 | 4/2012 | Mahoney |
| 2013/0046541 A1 | 2/2013 | Klein et al. |
| 2014/0085446 A1 | 3/2014 | Hicks |
| 2015/0219757 A1 | 8/2015 | Boelter et al. |
| 2018/0151036 A1 * | 5/2018 | Cha ........................ G10L 21/06 |
| 2023/0104182 A1 * | 4/2023 | Torres Hinojosa .. G09B 21/009 434/250 |
| 2023/0273039 A1 * | 8/2023 | Alsharif ................ G06V 20/64 |
| 2024/0062548 A1 * | 2/2024 | Hazeli ................... G06V 10/82 |
| 2025/0087113 A1 * | 3/2025 | Stevens ................ G10L 21/18 |

FOREIGN PATENT DOCUMENTS

| | | | | |
|---|---|---|---|---|
| WO | WO-2022061380 A1 * | 3/2022 | ............ | G02C 11/10 |
| WO | WO-2023027998 A1 * | 3/2023 | ............ | G09B 19/04 |
| WO | WO-2025000395 A1 * | 1/2025 | ............ | G06F 3/011 |

* cited by examiner

SYSTEMS AND METHODS FOR USING AN ACCESSIBILITY HEADSET SYSTEM FOR PROVIDING DIRECTIONS TO AUDIO AND VISUALLY IMPAIRED USERS

BACKGROUND

Visually impaired users and audio impaired users may use devices and/or systems to assist them with their impairments. For instance, a camera may be used to assist visually impaired users in navigating around obstacles. However, while these traditional devices and/or systems may function adequately when visually impaired and/or audio impaired users are performing routine tasks, they are not capable of accounting for the numerous other tasks that these users may encounter weekly or even daily. For example, emergency situations may occur rarely, but when they do occur, they may become difficult for audio impaired or visually impaired users unless accounted for. Furthermore, even a trip to a storefront (e.g., a grocery store or a retail store) may prove difficult for some visually impaired or audio impaired users as navigating the passageways and aisles to reach a product might not be possible without assistance from other individuals. Accordingly, there remains a technical need to provide devices and systems that enable audio and visually impaired users to be more independent regardless of the situations these users encounter.

SUMMARY

In some examples, the present application may use an accessibility headset system for providing directions to audio and visually impaired users. For instance, the accessibility headset system may use one or more sensors and/or devices (e.g., sonar sensors and/or light detection and ranging (LIDAR) devices) to obtain feedback regarding the surroundings for a user. For example, based on the feedback from the one or more sensors, the accessibility headset system may determine one or more obstacles that surround the user. Furthermore, the accessibility headset may use one or more additional sensors (e.g., infrared (IR) sensors) to assist the user with navigating within a storefront such as a grocery store, retail store, and/or other location that sells products and/or items. For instance, products or items within the storefront may include a beacon (e.g., an IR beacon). Based on user feedback, the accessibility headset system may activate the beacon associated with the product, and the accessibility headset system may detect feedback (e.g., IR feedback) from the beacon. Using the feedback from the beacon and the feedback from the one or more sensors, the accessibility headset system may provide navigation instructions to the user using an output system (e.g., an output system comprising haptic devices and/or additional devices such as augmented reality (AR) glasses and/or an audio output device). In some instances, the accessibility headset system may provide updated navigation instructions to the user based on additional feedback from the one or more sensors and/or devices (e.g., sonar sensors and/or LIDAR devices). Additionally, and/or alternatively, the accessibility headset system may perform additional functionalities (e.g., using machine learning models to detect emergency situations, using wearable devices for geo-fencing, and/or determining sign language expressions and outputting text, vibrational signals, and/or audio associated with the determined sign language expressions). This will be described in further detail below.

In one aspect, an accessibility headset for visually impaired or hearing impaired users is provided. The accessibility headset comprises: one or more light detection and ranging (LIDAR) devices configured to obtain LIDAR measurements; one or more infrared (IR) sensors configured to obtain IR feedback from one or more products; an output system comprising: one or more haptic devices configured to provide haptic feedback to a user; and a second output device configured to provide alternative feedback to the user; and a processor configured to: receive an indication of whether the user is visually impaired or hearing impaired; receive, from the one or more IR sensors, first IR feedback indicating a location of a first product within a geographical area, wherein the first product is associated with a beacon that emits the first IR feedback; receive, from the one or more LIDAR devices, a set of initial LIDAR measurements indicating one or more first obstacles surrounding the user; determine, based on the first IR feedback and the set of initial LIDAR measurements, a set of navigation instructions to direct the user to the first product by avoiding the one or more first obstacles; provide, to the user, one or more first instructions from the set of navigation instructions using the output system, wherein the one or more first instructions are provided to the user using the output system based on the indication of whether the user is visually impaired or hearing impaired; after outputting the one or more first instructions, receive, from the one or more LIDAR devices, one or more sets of additional LIDAR measurements indicating one or more additional obstacles surrounding the user; update, based on the one or more sets of additional LIDAR measurements, the set of navigation instructions to avoid the one or more additional obstacles surrounding the user; and provide, to the user, one or more second instructions from the set of updated navigation instructions using the output system and based on the indication of whether the user is visually impaired or hearing impaired, wherein the one or more second instructions are provided to the user using the output system based on the indication of whether the user is visually impaired or hearing impaired.

Examples may include one of the following features, or any combination thereof. For instance, in some examples, the accessibility headset further comprises: an audio detection device configured to obtain one or more voice prompts from the user, and the processor is configured to receive the indication of whether the user is visually impaired or hearing impaired based on the one or more obtained voice prompts.

In some variations, the processor is further configured to: provide, to the beacon associated with the first product, activation information based on the one or more voice prompts from the user, and the beacon emits the first IR feedback in response to obtaining the activation information from the accessibility headset.

In some instances, the audio detection device is further configured to obtain audio information from an environment surrounding the user, and the processor is further configured to: input the audio information into one or more emergency detection machine learning models to determine whether the audio information indicates an emergency; and based on the audio information indicating the emergency, providing, to the user, emergency information indicating the emergency using the output system.

In some examples, the processor is further configured to: obtain, from one or more wearable devices, geo-fencing information indicating a boundary around the user, and the processor is configured to determine the set of navigation instructions to direct the user to the first product by avoiding the one or more first obstacles based on the geo-fencing information.

In some variations, the processor is further configured to: provide, to the one or more wearable devices, the one or more first instructions from the set of navigation instructions, wherein the one or more wearable devices are configured to provide haptic feedback to the user indicating the one or more first instructions, and provide, to the one or more wearable devices, the one or more second instructions from the set of updated navigation instructions, wherein the one or more wearable devices are configured to provide haptic feedback to the user indicating the one or more second instructions.

In some instances, the processor is configured to provide the one or more first instructions by: providing, using the one or more haptic devices, first haptic feedback indicating the one or more first instructions; and providing, using the second output device, first alternative feedback indicating the one or more first instructions, and wherein the processor is configured to provide the one or more second instructions by: providing, using the one or more haptic devices, second haptic feedback indicating the one or more second instructions; and providing, using the second output device, second alternative feedback indicating the one or more second instructions.

In some examples, the second output device comprises conduction headphones, wherein providing the first alternative feedback indicating the one or more first instructions comprises providing first vibrations to the user, and wherein providing the second alternative feedback indicating the one or more second instructions comprises providing second vibrations to the user.

In some variations, the second output device comprises augmented reality (AR) glasses, wherein providing the first alternative feedback indicating the one or more first instructions comprises providing first prompts to the user using the AR glasses, and wherein providing the second alternative feedback indicating the one or more second instructions comprises providing second prompts to the user using the AR glasses.

In some instances, the second output device comprises an audio output device, wherein providing the first alternative feedback indicating the one or more first instructions comprises providing first audio to the user using the audio output device, and wherein providing the second alternative feedback indicating the one or more second instructions comprises providing second audio to the user using the audio output device.

In some examples, the accessibility headset further comprises: one or more light sensors configured to obtain light measurements indicating ambient light around the user, and the processor is further configured to: provide, using the output system, an ambient light indication of the ambient light around the user.

In some variations, the accessibility headset further comprises: one or more sonar sensors configured to obtain sonar measurements, and the processor is configured to determine the set of navigation instructions to direct the user to the first product based on the sonar measurements.

In some instances, the processor is further configured to: obtain, using the one or more LIDAR devices, a plurality of hand gesture LIDAR measurements; determine, based on the plurality of hand gesture LIDAR measurements and one or more translation models, one or more sign language expressions; and output, using the output system, information indicating the one or more sign language expressions.

In some examples, the processor is configured to output the information indicating the one or more sign language expressions by: outputting, using the second output device, text associated with the one or more sign language expressions, wherein the second output device comprises augmented reality (AR) glasses.

In some variations, the processor is configured to output the information indicating the one or more sign language expressions by: outputting, using the second output device, vibrational signals associated with the one or more sign language expressions, wherein the second output device comprises conduction headphones.

In some instances, the processor is configured to output the information indicating the one or more sign language expressions by: outputting, using the second output device, audio associated with the one or more sign language expressions, wherein the second output device comprises an audio output device.

In another aspect, a method for using an accessibility headset for visually impaired or hearing impaired users is provided. The method comprises: receiving, by the accessibility headset, an indication of whether a user is visually impaired or hearing impaired; receiving, by the accessibility headset and from one or more infrared (IR) sensors, first IR feedback indicating a location of a first product within a geographical area, wherein the first product is associated with a beacon that emits the first IR feedback; receiving, by the accessibility headset and from one or more light detection and ranging (LIDAR) devices, a set of initial LIDAR measurements indicating one or more first obstacles surrounding the user; determining, by the accessibility headset and based on the first IR feedback and the set of initial LIDAR measurements, a set of navigation instructions to direct the user to the first product by avoiding the one or more first obstacles; providing, by the accessibility headset and to the user, one or more first instructions from the set of navigation instructions using an output system, wherein the output system comprises one or more haptic devices configured to provide haptic feedback to the user and a second output device configured to provide alternative feedback to the user, and wherein the one or more first instructions are provided to the user using the output system based on the indication of whether the user is visually impaired or hearing impaired; after outputting the one or more first instructions, receiving, by the accessibility headset and from the one or more LIDAR devices, one or more sets of additional LIDAR measurements indicating one or more additional obstacles surrounding the user; updating, by the accessibility headset and based on the one or more sets of additional LIDAR measurements, the set of navigation instructions to avoid the one or more additional obstacles surrounding the user; and providing, by the accessibility headset and to the user, one or more second instructions from the set of updated navigation instructions using the output system and based on the indication of whether the user is visually impaired or hearing impaired, wherein the one or more second instructions are provided to the user using the output system based on the indication of whether the user is visually impaired or hearing impaired.

Examples may include one of the following features, or any combination thereof. For instance, in some examples, the accessibility headset comprises an audio detection device, wherein the method further comprises: obtaining, using the audio detection device of the accessibility headset, one or more voice prompts from the user, and wherein receiving the indication of whether the user is visually impaired or hearing impaired is based on the one or more obtained voice prompts.

In some instances, the method further comprises: providing, by the accessibility headset and to the beacon associated with the first product, activation information based on the one or more voice prompts from the user, and wherein the beacon emits the first IR feedback in response to obtaining the activation information from the accessibility headset.

In yet another aspect, a non-transitory computer-readable medium having processor-executable instructions stored thereon is provided. The processor-executable instructions, when executed, facilitate: receiving an indication of whether a user is visually impaired or hearing impaired; receiving, from one or more infrared (IR) sensors, first IR feedback indicating a location of a first product within a geographical area, wherein the first product is associated with a beacon that emits the first IR feedback; receiving, from one or more light detection and ranging (LIDAR) devices, a set of initial LIDAR measurements indicating one or more first obstacles surrounding the user; determining, based on the first IR feedback and the set of initial LIDAR measurements, a set of navigation instructions to direct the user to the first product by avoiding the one or more first obstacles; providing, to the user, one or more first instructions from the set of navigation instructions using an output system, wherein the output system comprises one or more haptic devices configured to provide haptic feedback to the user and a second output device configured to provide alternative feedback to the user, and wherein the one or more first instructions are provided to the user using the output system based on the indication of whether the user is visually impaired or hearing impaired; after outputting the one or more first instructions, receiving, from the one or more LIDAR devices, one or more sets of additional LIDAR measurements indicating one or more additional obstacles surrounding the user; updating, based on the one or more sets of additional LIDAR measurements, the set of navigation instructions to avoid the one or more additional obstacles surrounding the user; and providing, to the user, one or more second instructions from the set of updated navigation instructions using the output system and based on the indication of whether the user is visually impaired or hearing impaired, wherein the one or more second instructions are provided to the user using the output system based on the indication of whether the user is visually impaired or hearing impaired.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
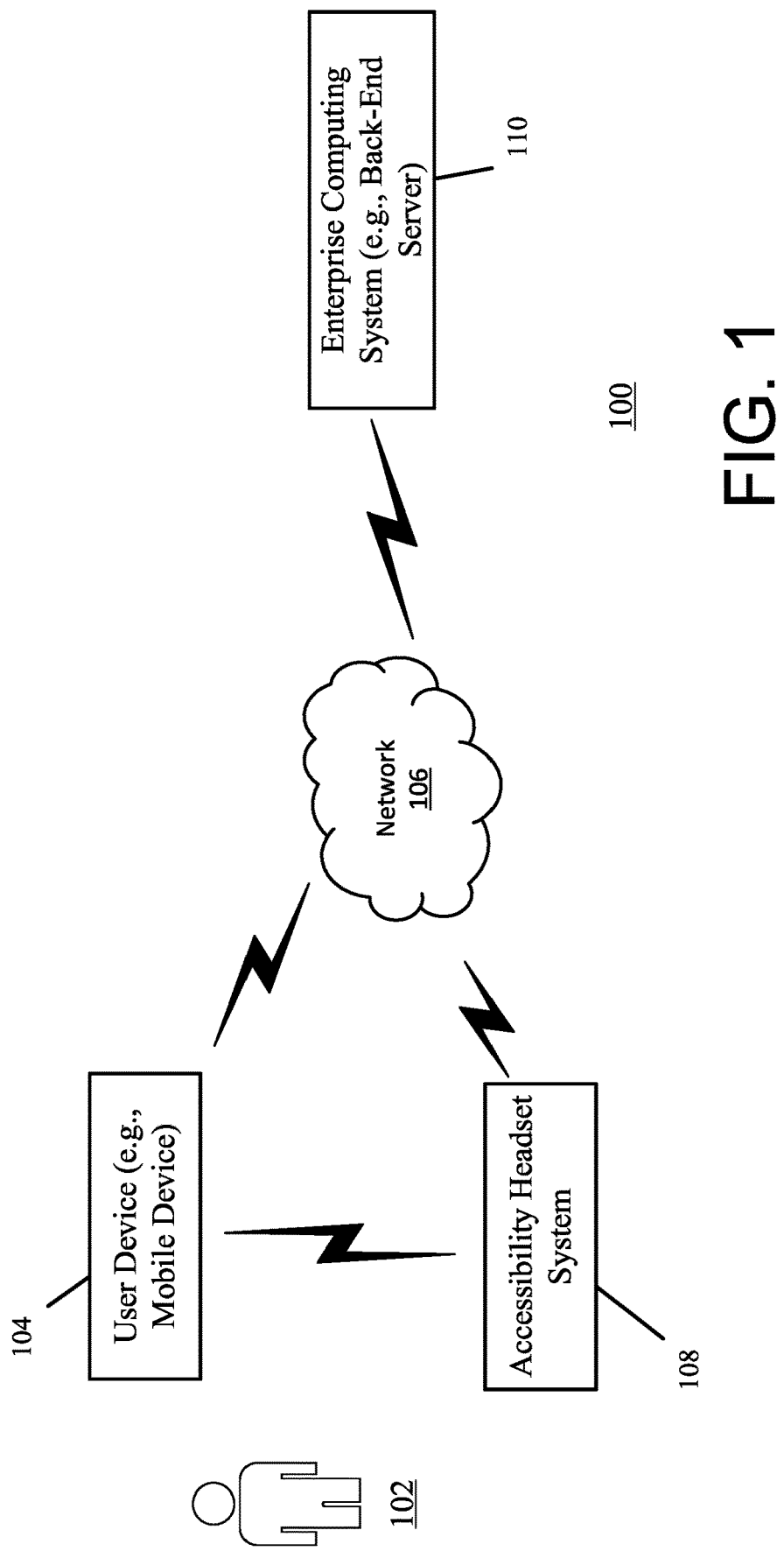
FIG. 1 is a simplified block diagram depicting an exemplary computing environment in accordance with one or more examples of the present application.

Systems, methods, and computer program products are herein disclosed that provide for using an accessibility headset system for providing directions (e.g., navigational instructions) to audio and visually impaired users. FIG. 1 is a simplified block diagram depicting an exemplary environment in accordance with an example of the present application. The environment 100 includes an individual (e.g., user) 102, a user device (e.g., mobile device) 104 associated with the individual 102 (e.g., a user), an accessibility headset system 108, and an enterprise computing system (e.g., back-end server) 110. Although the entities within environment 100 may be described below and/or depicted in the FIGS. as being singular entities, it will be appreciated that the entities and functionalities discussed herein may be implemented by and/or include one or more entities.

The entities within the environment 100 such as the user device 104, the accessibility headset system 108, and the enterprise computing system 110 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the user device 104 may be in communication with the accessibility headset system 108 without using the network 106. For instance, the user device 104 may use one or more communication protocols such as WI-FI or BLUETOOTH to communicate with the accessibility headset system 108.

User 102 may operate, own, and/or otherwise be associated with a user device 104. For instance, the user device 104 may be a mobile phone such as a smartphone that is owned and/or operated by the user 102. The user 102 may provide information to the other entities of environment 100 such as the accessibility headset system 108 and/or the enterprise computing system 110 using the user device 104. For example, the user device 104 may receive user input from the individual 102 such as indications to download, operate, and/or manage a software application associated with an enterprise organization. The enterprise organization may be any type of corporation, company, organization, and/or other institution. In some instances, the enterprise organization may own, operate, and/or be otherwise associated with one or more storefronts such as retail stores, grocery stores, and/or other facilities that sell products/items. The software application may be an application that is used by the user device 104 to communicate with the accessibility headset system 108 as well as the enterprise computing system 110.

The user device 104 may be and/or include, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications managed by, in communication with, and/or otherwise associated with the enterprise organization.

The accessibility headset system 108 may be a system that assists audio impaired users and/or visually impaired users. For instance, the accessibility headset system 108 may include an accessibility headset device and/or one or more wearable devices. The accessibility headset device may include one or more sensors such as LIDAR sensors (e.g., a LIDAR device), IR sensors, and/or sonar sensors that are configured to detect sensor feedback. The accessibility headset device may further include one or more output devices such as a haptic feedback device and/or additional output devices (e.g., visual or audio output devices). Based on the detected sensor feedback, the accessibility headset device may determine navigational instructions for the user 102 to navigate to a particular product within a storefront, and may output the navigational instructions to the user 102 using the output devices. The accessibility headset system may include additional functionalities such as using machine learning models to detect emergency situations. The functionality, sensors, and/or devices of the accessibility headset system 108 will be described in further detail below.

The enterprise computing system 110 is a computing system that is associated with the enterprise organization. The enterprise computing system 110 includes one or more computing devices, computing platforms, systems, servers, and/or other apparatuses capable of performing tasks, functions, and/or other actions for the enterprise organization. In some instances, the enterprise computing system 110 may, for example, receive and/or provide information from the user device 104 and/or the accessibility headset system 108. The enterprise computing system 110 may be implemented using one or more computing platforms, devices, servers, and/or apparatuses. In some variations, the enterprise computing system 110 may be implemented as engines, software functions, and/or applications. In other words, the functionalities of the enterprise computing system 110 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by health care enterprise organizations. However, in other instances, the environment 100 may be used by other types of enterprise organizations such as financial institutions or insurance institutions.

Figure 2:
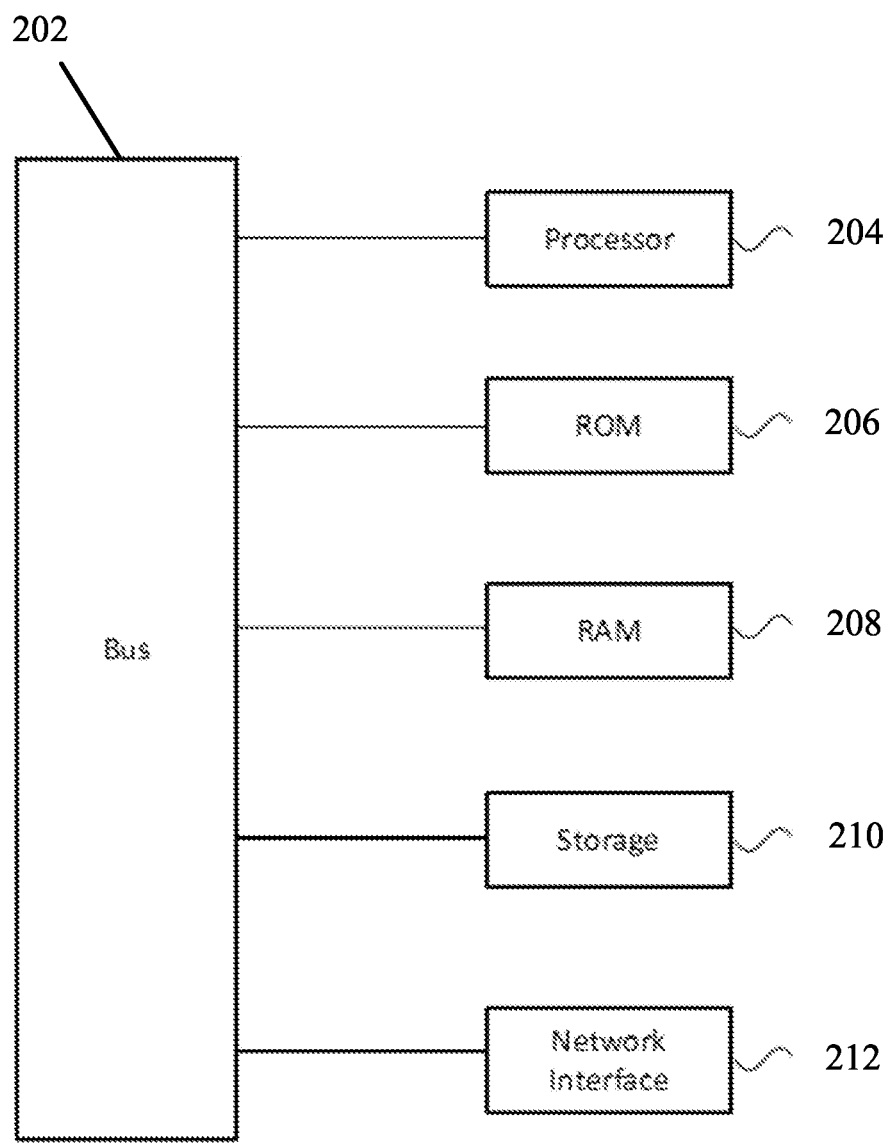
FIG. 2 is a simplified block diagram of one or more devices or systems within the exemplary environment of FIG. 1.

FIG. 2 is a block diagram of an exemplary system and/or device 200 within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. For example, as will be described below, the accessibility headset system 108 may include some of the components within the device/system 200 and may also include further components such as one or more sensors. Additionally, and/or alternatively, the device/system 200 may further include components that might not be included within every entity of environment 100.

Figure 3:
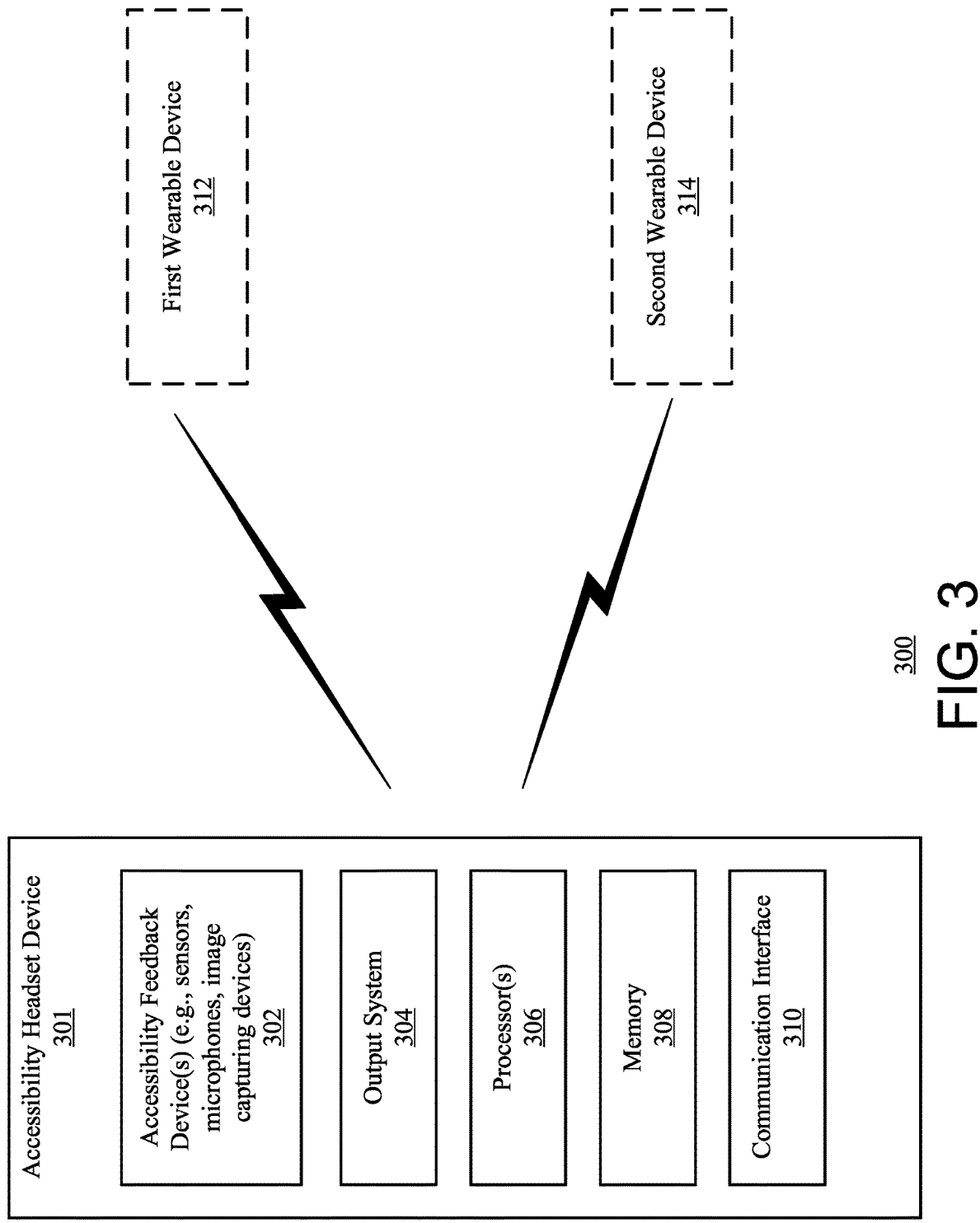
FIG. 3 is a simplified block diagram depicting an exemplary accessibility headset system in accordance with one or more examples of the present application.

FIG. 3 is a simplified block diagram depicting an exemplary accessibility headset system 300 in accordance with one or more examples of the present application. In some examples, the accessibility headset system 300 may be a more detailed example of the accessibility headset system 108 of environment 100. The accessibility headset system 300 includes an accessibility headset device 301 that is wearable by a user (e.g., the user 102). For instance, the accessibility headset device 301 may be a headset that is worn by a visually impaired user and/or audio impaired user (e.g., a hearing impaired user). The accessibility headset device 301 may facilitate interactions and exchanges for the visually and/or audio impaired user. For instance, the accessibility headset device 301 includes accessibility feedback device(s) 302 (e.g., sensors, microphones, and/or image capturing devices). The accessibility feedback devices 302 may be configured to obtain feedback (e.g., sensor feedback) and/or other information. For example, the accessibility feedback devices 302 may include one or more sensors and/or devices that are configured to obtain information such as sonar information, LIDAR information, IR information, ambient light information, audio information (e.g., via a microphone), and/or imaging information (e.g., via an image capturing device).

For instance, in some variations, the accessibility feedback devices 302 may provide an activation command to a beacon (e.g., an IR emitter) of a product. Based on the activation command, the beacon may provide an IR signal that is detectable by the accessibility feedback devices 302

(e.g., by an IR receiver). The accessibility feedback devices 302 may further obtain sonar information, LIDAR information, and/or ambient light information to determine obstacles surrounding the user and the accessibility headset device 301. Additionally, and/or alternatively, the accessibility feedback devices 302 may further obtain audio information and/or imaging information to perform one or more additional functions (e.g., using machine learning models to determine whether the audio information indicates an emergency situation and/or using the imaging information to detect sign language expressions).

The accessibility headset device 301 may further include processor(s) 306. The processor(s) 306 may be any type of hardware and/or software logic, such as a central processing unit (CPU), RASPBERRY PI processor/logic, controller, and/or logic, that executes computer executable instructions for performing the functions, processes, and/or methods described herein. For example, the processor(s) 306 may receive information from the accessibility feedback devices 302 and perform one or more functionalities based on the information. For instance, the processor(s) 306 may detect obstacles surrounding the user using the LIDAR and/or sonar information. An obstacle may be anything physical (e.g., a store aisle, another user, an object, and/or other physical impedances) that partially and/or completely impedes the movement of a user. For example, the user may be in a storefront and may seek to navigate to a product (e.g., toothpaste). However, due to one or more obstacles (e.g., store aisles and/or other users), the user might not be able to navigate to the product using the shortest possible path. As such, the processor(s) 306 may determine a set of navigation instructions (e.g., directions) to navigate the user to the product based on the detected obstacles. Additionally, and/or alternatively, the processor(s) 306 may use the IR information to determine a location of the product. For instance, the product may include and/or be associated with a beacon. Based on an activation signal (e.g., an activation signal from the accessibility headset device 301 and/or the user device 104), the beacon may begin transmitting an IR signal that is detectable by the accessibility feedback devices 302. Based on the detection, the processor(s) 306 may determine a location or position of the product, and may determine the set of navigation instructions based on the location or position of the product.

The accessibility headset device 301 includes output system 304. The output system 304 may provide output such as audio output, visual output, haptic output and/or other output to the user. For instance, the output system 304 may include a haptic feedback device (e.g., haptic device) that provides haptic feedback to the user. For example, the haptic feedback device may provide the set of navigation instructions to the user using haptic feedback (e.g., haptic feedback indicating for the user to move forward, left, right, and/or backward). Additionally, and/or alternatively, the output system 304 may include audio output devices (e.g., a microphone/speaker system that is configured to obtain and/or output audio information) and/or visual output devices (e.g., augmented reality (AR) glasses and/or other types of visual output). The audio output devices may output audio information such as audio indicating the set of navigation instructions. The visual output devices may output visual information such as text, icons, signals, and/or other types of visual information that indicate the set of navigation instructions. Additionally, and/or alternatively, the output system 304 may include conduction headphones. The conduction headphones may provide sound waves to the user (e.g., sound waves through the bones in a user's skull rather than their ear canal). For instance, the conduction headphones may provide the sound waves indicating the set of navigation instructions to the user. The output system 304 may include additional and/or alternative output devices that provide output information to the user such as the set of navigation instructions.

The accessibility headset device 301 includes memory 308. In some examples, the memory 308 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM such as the RAM 208), a ROM such as ROM 206, an erasable programmable read-only memory (EPROM or Flash memory), a compact disc read-only memory (CD ROM), or other tangible optical or magnetic storage device. The computer-readable medium may store computer-readable instructions/program code for carrying out operations of the present application. For example, when executed by the processor(s) 306, the computer-readable instructions/program code may carry out operations described herein.

The accessibility headset device 301 includes a communication (e.g., network) interface 310. The processor(s) 306 uses the communication interface 310 to communicate with other devices and/or systems within the environment 100. The communication interface 310 may include the functionalities and/or be the network interface 212 shown in FIG. 2. For example, the processor(s) 306 may receive and/or provide information to the user device 104 and/or the enterprise computing system 110 using the communication interface 310.

Additionally, and/or alternatively, the communication interface 310 may be used to communicate with one or more optional wearable devices (e.g., a first wearable device 312 and a second wearable device 314). For example, in some instances, the accessibility headset system 300 may include a first wearable device 312 and/or a second wearable device 314. The first wearable device 312 and the second wearable device 314 are denoted using dashed lines to indicate that they are optional. When present, the user may wear the first wearable device 312 and the second wearable device 314. The first and second wearable devices 312, 314 may include one or more sensors that are configured to obtain sensor information and provide the sensor information to the accessibility headset device 301 using the communication interface 310. Additionally, and/or alternatively, the first and second wearable devices 312, 314 may include output devices (e.g., haptic feedback devices) that are configured to provide output information to the user. The output information may indicate the set of navigational instructions and/or other output feedback. While only two wearable devices 312, 314 are shown in FIG. 3, the accessibility headset system 300 may include any number of wearable devices (e.g., zero wearable devices, four wearable devices, five wearable devices and so on).

In some instances, the wearable devices (e.g., the first and second wearable devices 312, 314) may be wrist bands, ankle bands, chest bands, and/or waist bands that the user may wear. For instance, the wrist and/or ankle bands may include and/or may be embedded with one or more haptic sensors that are configured to provide haptic feedback to the user. Additionally, and/or alternatively, the wearable devices may include and/or be in communication with one or more additional sensors. For instance, the wearable devices may include health sensors to obtain health information (e.g., vitals) of the individual 102. The wearable devices may provide the health information to the accessibility headset device 301 and/or provide real-time health information to providers and/or physicians such as when the individual 102 is moving around the storefront. Additionally, and/or alternatively, the wearable devices may include temperature sensors and/or humidity sensors that may be configured to provide temperature/humidity measurements of the user. Based on the temperature and/or humidity sensors, the wearable devices and/or the accessibility headset device 301 may be configured to determine a health status of the individual 102 such as whether the individual 102 has a fever, is dehydrated and/or needs more liquids. In some instances, the wearable devices may be the wearable devices and/or a smart vital device and/or may perform the functionalities of the wearable devices/the smart vital device described in U.S. patent application Ser. No. 16/886,464, titled "SYSTEMS AND METHODS FOR DETERMINING AND USING HEALTH CONDITIONS BASED ON MACHINE LEARNING ALGORITHMS AND A SMART VITAL DEVICE", U.S. patent application Ser. No. 16/916,004, titled "SYSTEM AND METHODS UTILIZING ARTIFICIAL INTELLIGENCE ALGORITHMS TO ANALYZE WEARABLE ACTIVITY TRACKER DATA", and/or U.S. Pat. No. 11,055,981, titled "SYSTEMS AND METHODS FOR USING PRIMARY AND REDUNDANT DEVICES FOR DETECTING FALLS", which are each incorporated by reference herein in their entirety.

Additionally, and/or alternatively, the wearable devices may include additional and/or alternative sensors. For instance, the wearable devices may include one or more distance sensors that are configured to provide distance information to the accessibility headset device 301. Based on the distance sensors, the accessibility headset device 301 may determine a geo-fence of the user. The geo-fence may indicate a boundary (e.g., a virtual perimeter) surrounding the user. For example, the accessibility headset device 301 may obtain user data indicating attributes of the individual 102 such as a body mass index (BMI) of the individual 102, the height of the individual 102, the weight of the individual 102, the arm length of the individual 102, and/or other attributes of the individual 102. Based on the distance information from the distance sensors and/or the user data, the accessibility headset device 301 may determine the arm length of the individual 102 and/or the stride width (e.g., the stride) of the individual. For instance, the accessibility headset device 301 may obtain user data indicating a BMI of the individual 102 and based on the BMI, may determine that the individual 102 is 6 feet tall, their arms stretch 2.6 feet to the side and 2.4 feet to the front, and the stride is 3.2 feet. Additionally, and/or alternatively, the accessibility headset device 301 may obtain user feedback from the individual 102 that may correct one or more of the determinations (e.g., the individual 102 is actually 5 feet 10 inches and has a stride of 2.5 feet).

The accessibility headset device 301 may determine the geo-fence (e.g., the boundary) for the individual 102 based on the user data and/or the user feedback. Then, the accessibility headset device 301 may use the distance sensors from the wearable devices and the determined geo-fence for the individual 102 to perform obstacle avoidance. For instance, the accessibility headset device 301 may include LIDAR and/or sonar sensors that obtain LIDAR measurements and sonar measurements. The accessibility headset device 301 may use the information from the distance sensors (e.g., the edge of the individual's foot or the tips of the fingers from the individual's arm), the determined geo-fence boundary, and/or the detected obstacles from the LIDAR/sonar measurements in order to provide obstacle avoidance. For instance, based on the geo-fence boundary of the individual 102 intersecting with the detected obstacles from the LIDAR/sonar measurements, the accessibility headset device 301 may output one or more alerts. For example, the stride length or the arm length of the individual 102 might not fit through a corridor (e.g., a store aisle of a storefront) due to obstacles. In such instances, the accessibility headset device 301 may use the output system 304 to output alerts indicating for the individual 102 to keep the individual's arms close to their sides or walk sideways to get through the corridor. In some instances, the output system 304 may indicate for the individual to stop taking the current path and the accessibility headset device 301 may determine and/or provide an alternative path for the individual 102.

Additionally, and/or alternatively, the accessibility headset device 301 may update the geo-fence boundary using the distance sensors. For instance, based on the LIDAR measurements and the distance measurements from the distance sensor of the wearable device, the accessibility headset device 301 may update the geo-fence boundary. For example, the accessibility headset device 301 may determine, based on the distance measurements that the edge of the individual's foot or the tips of the fingers of the individual reach a boundary of an obstacle determined by the LIDAR measurements. Based on this, the accessibility headset device 301 may update the geo-fence boundary.

The accessibility headset system 300 is merely exemplary and the accessibility headset system 300 (e.g., the accessibility headset device 301) may include additional or alternative devices, components, and/or sensors as well as perform additional or alternative functions or processes.

Figure 4:
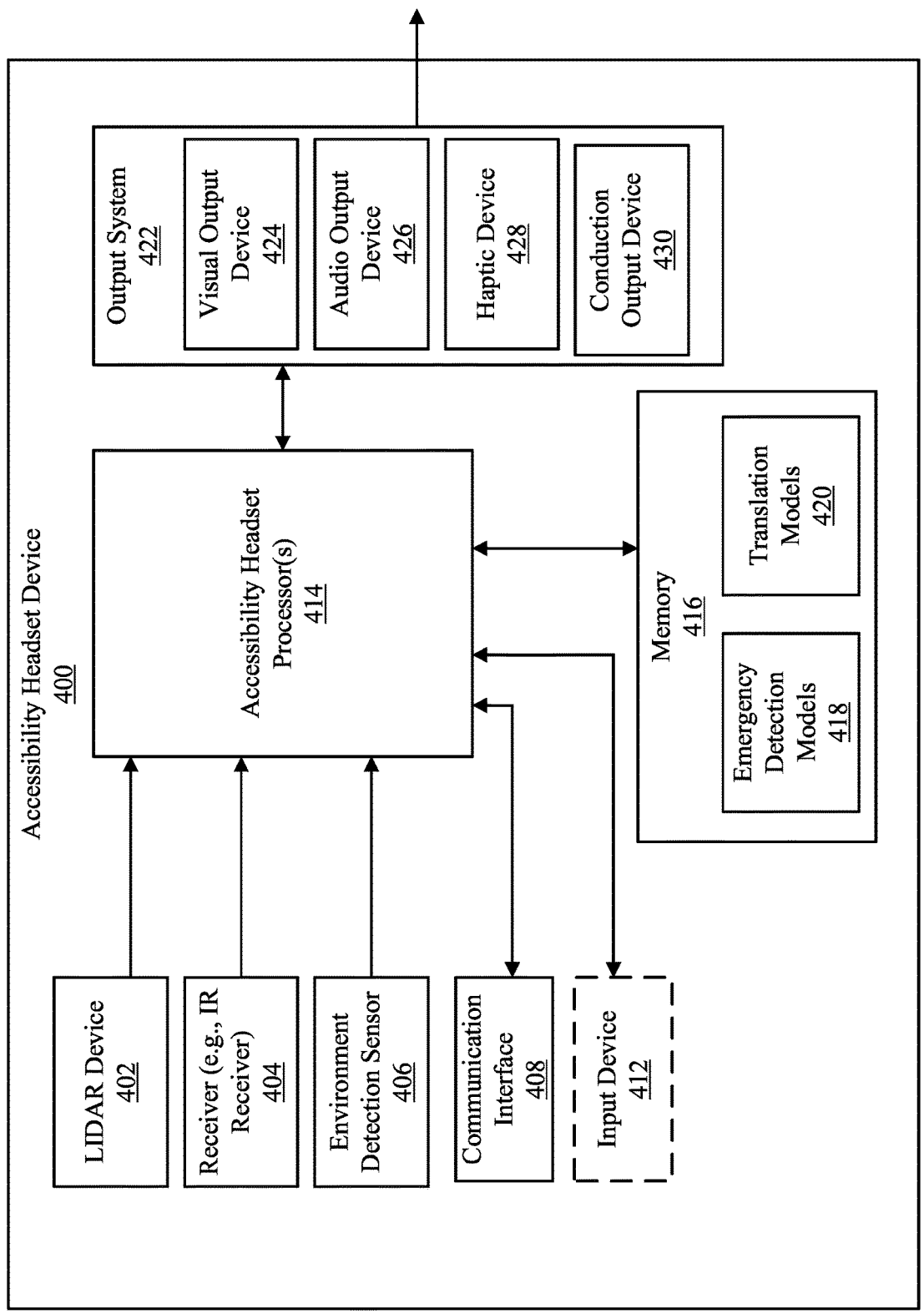
FIG. 4 is a simplified block diagram depicting an exemplary accessibility headset device in accordance with one or more examples of the present application.

FIG. 4 is a simplified block diagram depicting an exemplary accessibility headset device 400 in accordance with one or more examples of the present application. In some examples, the accessibility headset device 400 may be a more detailed example of the accessibility headset device 301 of the accessibility headset system 300. For instance, the accessibility feedback device 302 may include and/or be associated with the LIDAR device 402, the receiver 404 (e.g., the IR receiver 404), and the environment detection sensor 406. The output system 422 may be the output system 304. Furthermore, the accessibility headset device 400 shows the communication (e.g., exchange of information) between the components within the accessibility headset device 400.

The accessibility headset processor(s) 414 (e.g., processor 414) may be configured to perform one or more functions and/or processes for the accessibility headset device 400. For instance, the accessibility headset processor 414 may be configured to receive sensor and/or feedback information (e.g., from the LIDAR device 402, the receiver 404, and/or the environment detection sensor 406), determine sets of navigation instructions, and/or perform other functions and/or processes. The processor 414 may be the same as or similar to the processor 306 in FIG. 3.

The accessibility headset device 400 may include a LIDAR device 402 (e.g., a LIDAR sensor) that is configured to obtain LIDAR information and provide the LIDAR information to the processor 414. For instance, the LIDAR device 402 may emit light, which may reflect off of the surroundings. The LIDAR device 402 may detect the reflected light. Then, based on the reflected light (e.g., a time for the LIDAR device 402 to receive the light reflected off of the surroundings), the processor 414 may detect and/or determine one or more obstacles that surround the user. In some instances, using the LIDAR information, the processor 414 may generate one or more LIDAR images and/or environments (e.g., a 3-D LIDAR environment) of the surroundings of the user. The LIDAR images and/or environments may indicate the obstacles that surround the user. In some instances, the LIDAR device 402 may include four LIDAR sensors that are located on the four sides of the headset (e.g., sides, front, and back).

The accessibility headset device 400 may include a receiver 404 (e.g., an IR receiver) that is configured to obtain product information (e.g., IR feedback indicating a location of a product or item within a storefront). For instance, based on an activation signal, a beacon associated with a product or item may emit a signal (e.g., an IR signal) that is detectable by the receiver 404. The receiver 404 may detect the signal and provide product information indicating the detected signal to the processor 414. The product information may indicate a location of the product or item relative to the accessibility headset device 400. For instance, the product information may indicate a direction and/or distance that the user needs to navigate to reach the product or item within a storefront.

The accessibility headset device 400 may include one or more environment detection sensors 406. For instance, the environment detection sensors 406 may include a sonar sensor. The sonar sensor (e.g., an ultrasonic sensor) may be configured to measure distances of obstacles and/or objects surrounding a user using sonar. The sonar sensor may provide sonar information to the processor 414. The processor 414 may detect the obstacles surrounding the user using the sonar information. In some instances, the processor 414 may use the sonar information as an alternative to and/or in addition to the LIDAR information. For instance, the processor 414 may use the sonar information rather than the LIDAR information to detect the obstacles surrounding the user. Additionally, and/or alternatively, the processor 414 may use the sonar information in addition to the LIDAR information to detect the obstacles. For instance, the processor 414 may use the sonar information to ensure the obstacles detected by the LIDAR information is accurate, and vice versa.

Additionally, and/or alternatively, the environment detection sensors 406 may include one or more image capturing devices. The image capturing device may capture one or more images of the environment surrounding the user. For instance, another user may be providing hand gesture signals (e.g., sign language) in front of the user wearing the accessibility headset device 400. The image capturing device may capture one or more images and/or a video of the other user providing the hand gesture signals, and may provide the captured information to the processor 414. The processor 414 may determine the sign language expressions associated with the hand gesture signals using translation models (e.g., translation models 420) and use the output system 422 to provide an output associated with the determined sign language expressions. In some instances, the LIDAR device 402 may be used as an alternative and/or in addition to the image capturing device to determine the sign language expressions.

Additionally, and/or alternatively, the environment detection sensors 406 may include one or more audio devices (e.g., a microphone). The audio devices may obtain audio information associated with the environment surrounding the user. For instance, the audio devices may obtain audio information indicating sounds of the environment such as user voice commands. Additionally, and/or alternatively, the audio devices may indicate other types of sounds such as speech from other users and/or emergency sounds (e.g., sounds indicating a fire or gunshot or other types of emergencies). The audio devices may provide the audio information to the processors 414. In some instances, the processor 414 may use one or more emergency detection models 418 to determine whether the audio information indicates an emergency. For instance, the processor 414 may input the audio information into the emergency detection models 418 to determine an output. The output may indicate whether there is an emergency within the vicinity of the user, the type of emergency (e.g., fire or gunshot), and/or a probability that the output is accurate. Based on the output, the processor 414 may provide output indicating the emergency to the user.

The environment detection sensors 406 may include one or more light sensors that are configured to detect light measurements. The light measurements may indicate an ambient light around the user. For instance, the user may be visually impaired and the light measurements may indicate whether the environment is dark (e.g., whether it is nighttime and/or whether the user's surroundings are dark). The light sensors may provide the light measurements to the processor 414. The processor 414 may compare the light measurements with one or more thresholds. Based on the comparison, the processor 414 may output information to the user (e.g., it is nighttime currently). In some instances, the one or more light sensors and/or the processor 414 may use an ultraviolet (UV) index to provide an output to the individual 102. For instance, based on comparing the light measurements with the UV index, the processor 414 may indicate for the individual 102 to wear sunscreen or have an extra layer to prevent skin damage (e.g., output an audio alert indicating for the individual 102 to wear sunscreen).

The environment detection sensors 406 may include one or more olfactory sensors. The olfactory sensors may be configured to detect olfactory information indicating one or more smells of the environment surrounding the user. The olfactory sensors may provide the olfactory information to the processor 414. Based on the olfactory information, the processor 414 may provide one or more outputs using the output system 422. For instance, based on the smells indicating an emergency (e.g., a burning smell) and/or a dangerous smell (e.g., petroleum), the processor 414 may provide outputs indicating an alert (e.g., an alert indicating there is an emergency such as a fire or an alert indicating the dangerous smell such as petroleum). Additionally, and/or alternatively, the olfactory sensors may be configured to determine smells of food such as specific food smells and/or whether the food should be avoided. For instance, the processor 414 may obtain/retrieve a smell profile for the individual 102 that indicates the individual's favorite foods. Based on comparing the olfactory information with the smell profile, the processor 414 may determine that one of the individual's favorite foods is nearby, and provide an output using the output system 422 indicating that the food is nearby (e.g., an audio alert indicating that a street vendor is selling the food nearby). Additionally, and/or alternatively, the processor 414 may determine, based on the olfactory information, the food should be avoided and provide an output indicating that the food should be avoided (e.g., an audio alert indicating for the individual 102 to not eat the food as the food may be rotten or should be thrown out).

The environment detection sensors 406 may include a temperature sensor that monitors the temperature of the surroundings. The processor 414 may indicate suggestions for the individual 102 (e.g., that they should wear more clothes or seek an indoor location immediately) based on the temperature readings.

The environment detection sensors 406 may include a barometric pressure sensor that detects weather patterns of the surroundings of the individual (e.g., emerging weather patterns and/or thunderstorms). Based on the readings from the barometric pressure sensor, the processor 414 may indicate for the individual 102 to seek shelter.

The accessibility headset device 400 may include the communication interface 408, which may be similar to the communication interface 310 from FIG. 3. For instance, the accessibility headset device 400 may receive user input from a user device such as user device 104. For example, the user may provide user input to the user device 104, which may include information indicating whether the user is audio impaired (e.g., hearing impaired) and/or visually impaired and/or other user input/feedback. Additionally, and/or alternatively, the accessibility headset device 400 may be in communication (e.g., receive and/or provide information) to one or more wearable devices (e.g., wearable devices 312, 314) using the communication interface 408.

Additionally, and/or alternatively, the accessibility headset device 400 may be in communication with an enterprise computing system such as enterprise computing system 110. For instance, the enterprise computing system 110 may train one or more machine learning and/or artificial intelligence models, algorithms, and/or datasets. For example, the enterprise computing system 110 may train one or more emergency detection machine learning models for detecting an emergency. The emergency detection machine learning models may be any type of machine learning models such as supervised machine learning models, unsupervised machine learning models, and/or deep learning models. The enterprise computing system 110 may provide the trained machine learning/artificial intelligence models (e.g., the emergency detection machine learning models) to the accessibility headset device 400. Using the emergency detection machine learning models, the processor 414 may determine whether there is an emergency (e.g., whether there is a fire). Additionally, and/or alternatively, the enterprise computing system 110 may train other types of machine learning models, and provide the machine learning models to the accessibility headset device 400. The processor 414 may input information (e.g., olfactory information and/or the audio information) into the machine learning models to perform additional functions (e.g., detect whether there is a petroleum smell within the environment surrounding the user).

Additionally, and/or alternatively, the enterprise computing system 110 may obtain translation models (e.g., models that are used to determine sign language expressions such as machine learning models), and provide the translation models to the accessibility device 400. The translation models may be any type of model, algorithm, process, and/or function that is configured to translate hand gestures into sign language. For example, the enterprise computing system 110 may train the translation model (e.g., a machine learning model) using images of sign language expressions (e.g., the alphabet in sign language). Then, based on obtaining an image, the translation model may determine the text (e.g., a character, word, or phrase) from the images. Afterwards, the enterprise computing system 110 may provide the translation model to the accessibility headset device 400. For instance, the accessibility headset device 400 may use the LIDAR device 402 and/or the image capturing device to obtain hand gesture information (e.g., hand gesture signals, images, and/or videos). The processor 414 may use the hand gesture information and the translation models to determine sign language expressions (e.g., the sign language associated with the hand gestures). For instance, the user wearing the accessibility headset device 400 and/or another user that is in front of the user wearing the accessibility headset device may communicate using sign language. The processor 414 may obtain hand gesture information indicating the sign language and determine the sign language expressions (e.g., what the user or the other user is attempting to say using the sign language), and output the sign language expressions (e.g., output text associated with the sign language expressions).

In some instances, the accessibility headset device 400 includes an input device 412. The dashed lines denote that the input device 412 is optional. When present, the user may provide user input using the input device 412. For instance, the user may provide user input indicating whether the user is audio impaired and/or visually impaired.

The accessibility headset device 400 may include memory 416, which may be similar to the memory 308 from FIG. 3. The memory 416 may include the emergency detection models 418 (e.g., emergency detection machine learning models) and the translation models 420. For instance, after receiving the emergency detection models 418 and/or the translation models 420, the processor 414 may store them in memory 416.

The accessibility headset device 400 may include output system 422 such as a visual output device 424, an audio output device 426, a haptic device 428, and/or a conduction output device 430. For instance, the output system 422 may output information to the user such as navigation instructions to navigate a user to a product/item. For example, the visual output device 424 may output visual information to the user. The visual information may include, but is not limited to, text, icons, directional arrows, and/or other visual indicia or visual cues. For instance, the visual output device 424 may be and/or include AR glasses that are configured to provide text and/or directional arrows that overlay a path for the user to reach a product. Additionally, and/or alternatively, the visual output device 424 may provide visual cues of users coming from behind (e.g., bicyclists that are coming from behind) as well as other obstacles that a user who is not hearing impaired would be aware of (e.g., explosions or car crashes) that are outside the visual radius (e.g., peripheral vision) of the user. Additionally, and/or alternatively, the visual output device 424 may output text and/or other information indicating the determined sign language expressions. For instance, another user may provide hand gestures that are detected by the LIDAR device 402. The processor 414 may determine the sign language expressions (e.g., words, phrases, and/or sentences) associated with the hand gestures. The processor 414 may output the sign language expressions (e.g., the text) using the visual output device 424.

The audio output device 426 may output audio information to the user. For instance, the audio output device 426 may be a speaker system that provides audio to the user. In some instances, the audio output device 426 may provide audio indicating navigation directions (e.g., move straight, left, right, backwards, and so on) and/or alerts to the user.

The haptic device 428 may be configured to provide haptic feedback to the user. For instance, the haptic device 428 may include one or more haptic motors that provide the haptic feedback. In some instances, the haptic device 428 may include a haptic sensor on the bridge of the nose and another haptic sensor on the back of the headset 400. In some examples, the haptic feedback may indicate navigation instructions for the user. For instance, the haptic feedback may indicate for the user to move in a certain direction to reach a product/item. Additionally, and/or alternatively, the haptic feedback may indicate alerts (e.g., emergency situations such as fire or gunshot). For example, the haptic device 428 may provide haptic feedback pulses as a danger approaches (e.g., a bicycle coming from behind onto the user) and/or to direct the user in a certain direction (e.g., one pulse for moving forward and two pulses for moving right). Additionally, and/or alternatively, the haptic device 428 may provide a haptic feedback pattern indicating an alert (e.g., an emergency) and/or navigation instructions.

The conduction output device 430 may be a conduction headphone that is configured to provide conduction information to the user. For instance, the conduction headphone may provide sound waves (e.g., vibrations) through the bones in a user's skull to indicate certain information such as the navigation instructions and/or alerts. In other words, the accessibility headset device 400 may include a conduction output device 430 (e.g., a small sensor) that is placed over the bone of the individual 102 and provides bone vibrations, which the individual's brain can interpret as sound.

In some instances, the processor 414 may use machine learning/artificial intelligence models/algorithms (e.g., ML-AI models) to determine objects in the path of the user such as objects that are coming from the side or back of the user. For instance, using the information from the sensors/devices above (e.g., the LIDAR information and/or audio information) and the ML-AI models, the processor 414 may determine whether an object is approaching the user (e.g., a bicycle is approaching the user from behind). The processor 414 may provide output information using an output system 422 (e.g., the haptic device 428) based on the determination. For instance, the haptic device 428 may provide pulses that are greater in frequency and/or magnitude as the bicycle approaches the user.

The accessibility headset device 400 is merely exemplary and may include additional and/or alternative devices, components, and/or sensors as well as perform additional or alternative functions or processes.

Figure 5:
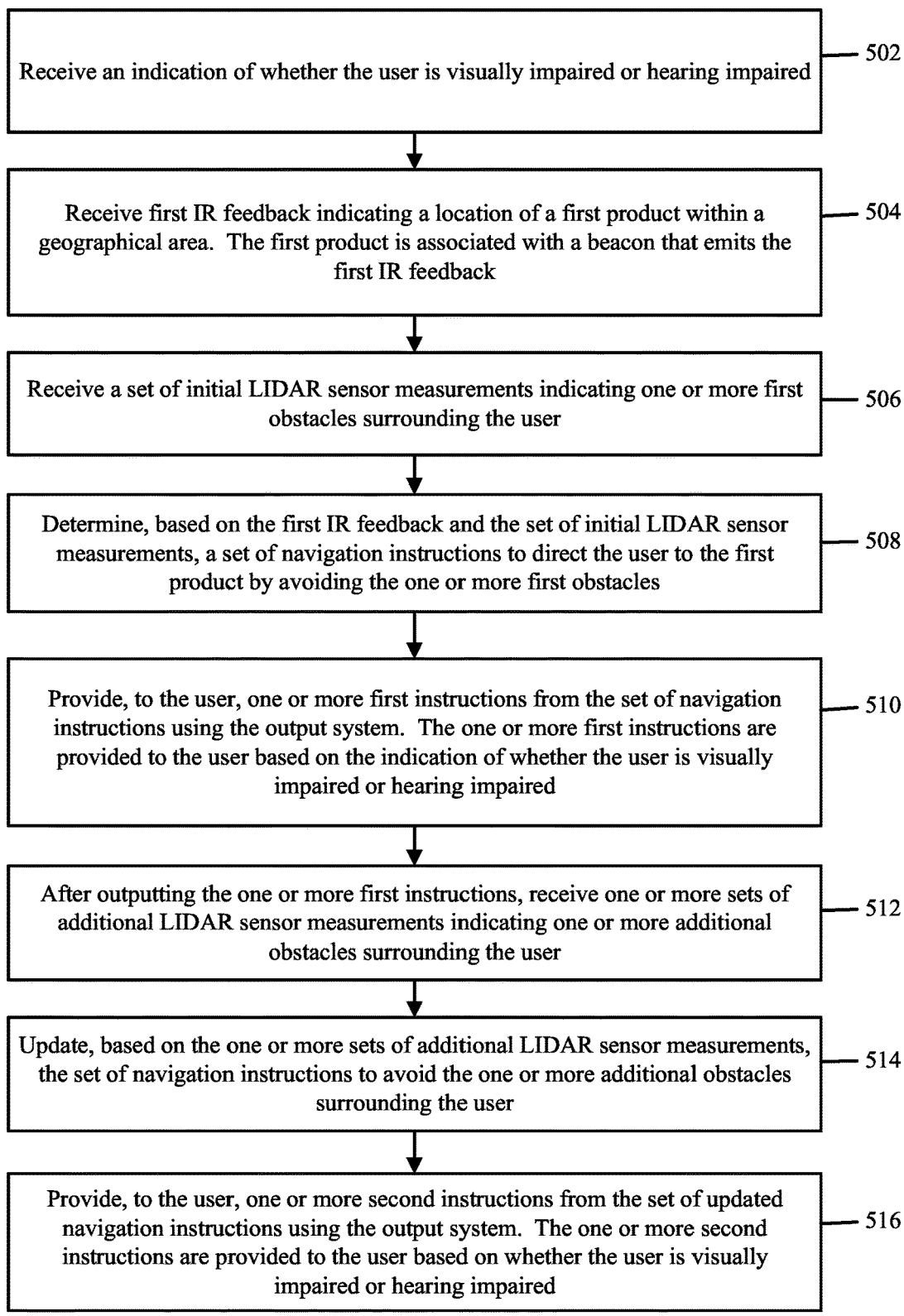
FIG. 5 is an exemplary process for using an accessibility headset system in accordance with one or more examples of the present application.
Figure 6A:
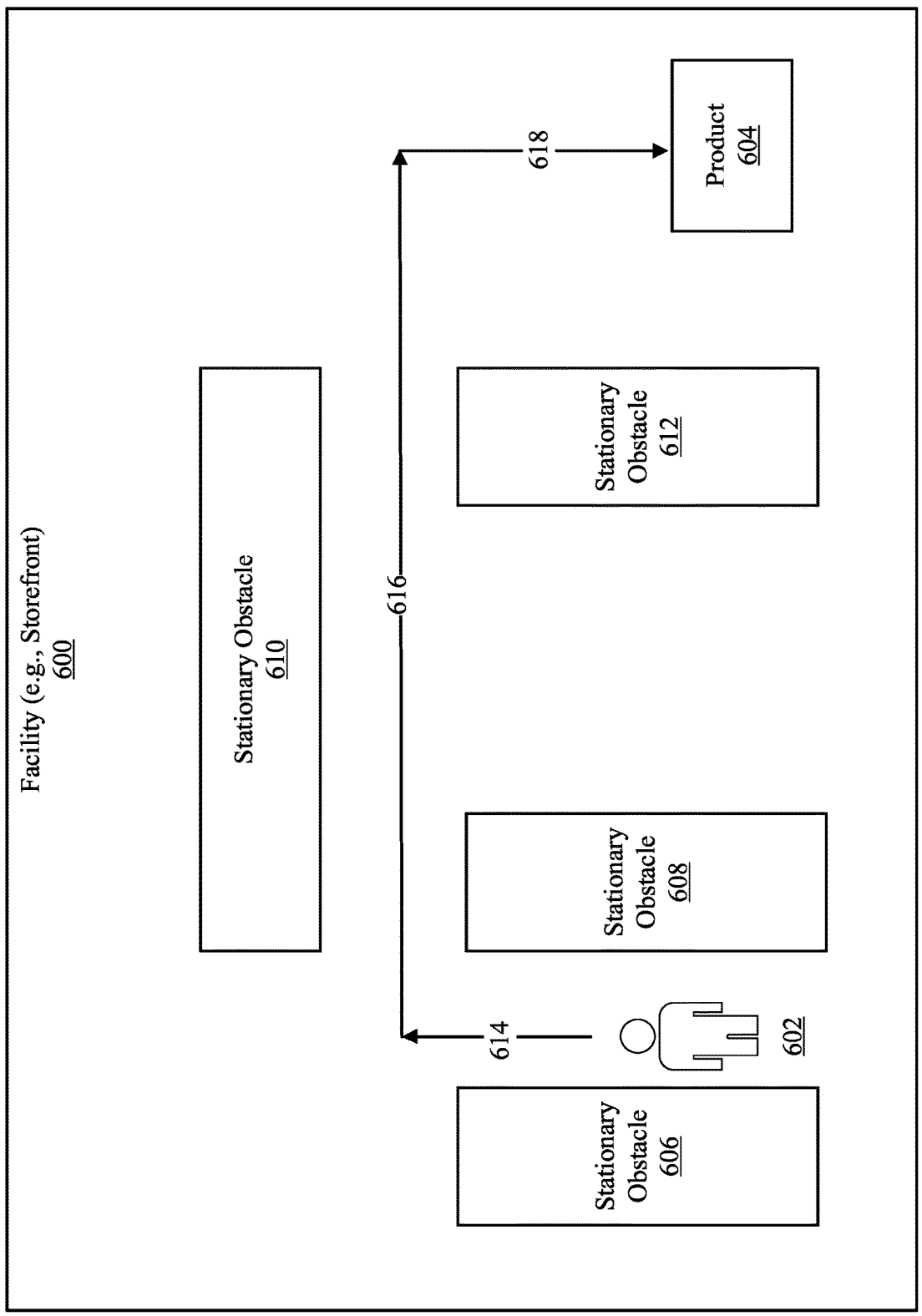
FIGS. 6A and 6B show a user navigating a storefront using the accessibility headset system in accordance with one or more examples of the present application.
Figure 6B:
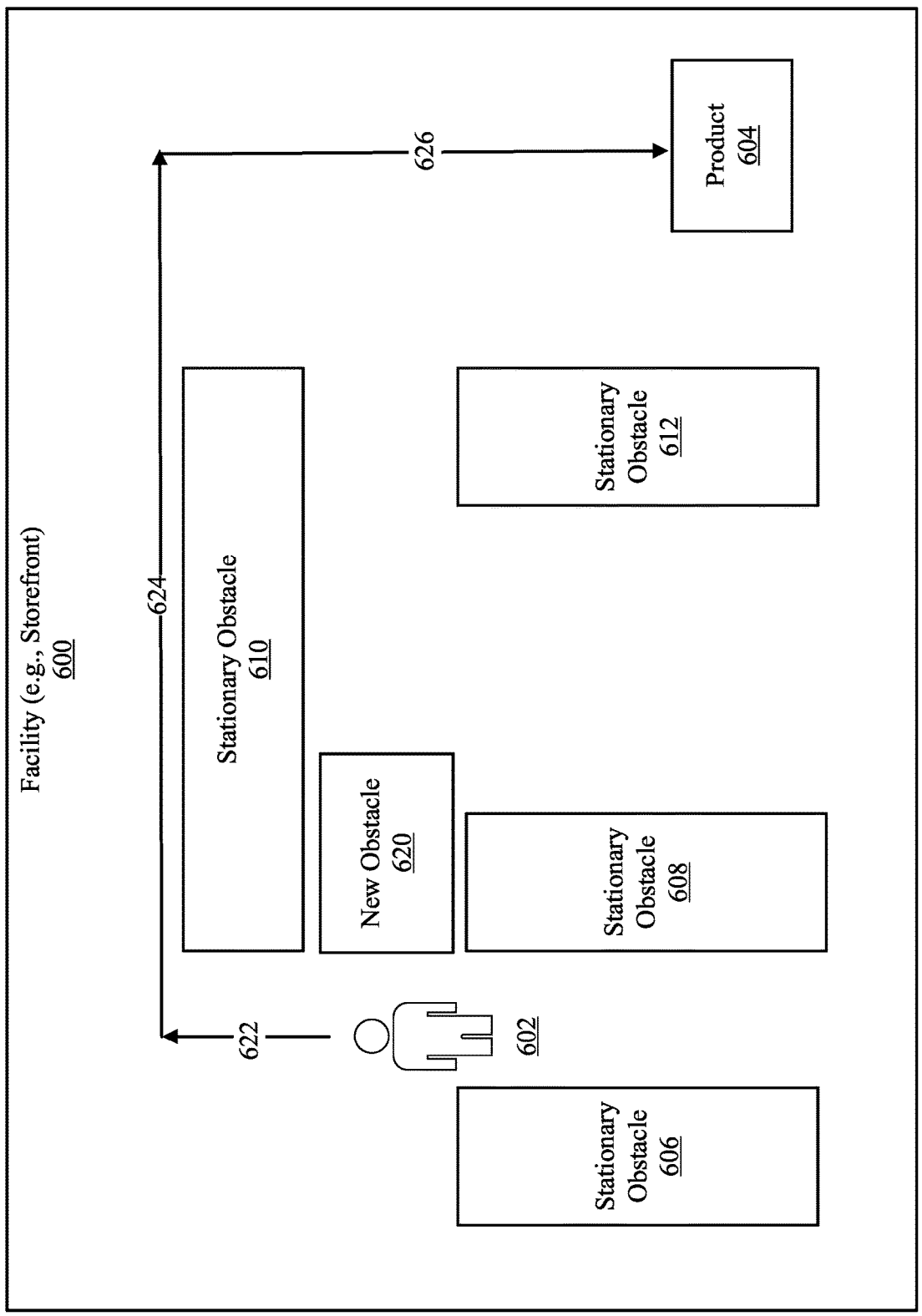

FIG. 5 is an exemplary process 500 for using an accessibility headset system in accordance with one or more examples of the present application. FIGS. 6A and 6B show a user navigating a storefront using the accessibility headset system in accordance with one or more examples of the present application, and will be used to describe process 500. The process 500 may be performed by the accessibility headset system 108, 300 and/or the accessibility headset device 301 and/or 400 shown in FIGS. 1, 3, and 4. However, it will be recognized that any of the following blocks may be performed in any suitable order and that the process 500 may be performed in any suitable environment. The descriptions, illustrations, and processes of FIG. 5 are merely exemplary and the process 500 may use other descriptions, illustrations, and processes for using an accessibility headset system.

At block 502, the accessibility headset system 108 (e.g., the accessibility headset device 301 and/or 400) receives an indication of whether the user is visually impaired or hearing impaired. For example, the user 102 may use the user device 104 to provide user input indicating whether the user is visually impaired or hearing impaired. The accessibility headset system 108 receives the user input indicating whether the user is visually impaired or hearing impaired from the user device 104. Additionally, and/or alternatively, the accessibility headset system 108 may include an input device and/or audio device (e.g., the input device 412 and/or the audio device described in FIG. 4) that obtains user input indicating whether the user is visually impaired or hearing impaired. As will be explained below, the accessibility headset system 108 may provide different types of output using different output devices based on the whether the user is visually impaired or hearing impaired. For instance, the accessibility headset system 108 may provide audio output and haptic feedback based on the user being visually impaired. The accessibility headset system 108 may provide visual output and haptic feedback based on the user being audio impaired. This will be described in further detail below.

At block 504, the accessibility headset system 108 receives first IR feedback indicating a location of a first product within a geographical area. The first product is associated with a beacon that emits the first IR feedback. For example, using the user device 104 and/or devices/sensors of the accessibility headset device (e.g., the input device 412, the audio device of the environment detection sensor 406, and/or other devices of the accessibility headset device 400), the accessibility headset system 108 may obtain user input (e.g., voice prompts and/or text) from the user 102. For instance, the user 102 may provide voice prompts indicating a product or item within a geographical area (e.g., a facility or storefront of a retail store). In response to the user input, the accessibility headset system 108 may provide activation information to the product (e.g., toothpaste). For instance, the product may include and/or be associated with a beacon that emits IR feedback. The accessibility headset system 108 may use a receiver (e.g., an IR receiver 404) to obtain the IR feedback from the product. In some instances, the IR feedback may indicate a location, direction, and/or distance of the product. For example, the accessibility headset system 108 may include way finder technology. The accessibility headset system 108 may receive a received signal strength indicator (RSSI) signal strength associated with the beacon. The accessibility headset system 108 may determine a distance between the system 108 and the product (e.g., the toothpaste) as well as a direction from the system 108 to the product (e.g., the toothpaste is northwest of the system 108).

At block 506, the accessibility headset system 108 receives a set of initial LIDAR sensor measurements indicating one or more first obstacles surrounding the user. For instance, using the LIDAR device 402, the accessibility headset system 108 receives LIDAR sensor measurements of an environment surrounding the user, including obstacles (e.g., an object that partially and/or completely impedes movement of the user). For example, using the LIDAR sensor measurements, the accessibility headset system 108 may determine (e.g., construct) an image and/or a 3-D model of the surroundings of the user, including the one or more obstacles. In some instances, the accessibility headset system 108 may use one or more ML-AI models to construct the 3-D model.

Additionally, and/or alternatively, the accessibility headset system 108 may receive other information from the environment detection sensors 406 such as sonar sensor information from a sonar sensor and/or visual information from the image capturing devices. The accessibility headset system 108 may use the other information (e.g., the sonar sensor information and/or the visual information) to confirm the first obstacles that were detected by the LIDAR sensor measurements. Additionally, and/or alternatively, the accessibility headset system 108 may use the other information to detect the first obstacles and use the LIDAR sensor measurements to confirm the first obstacles detected by the other information.

At block 508, the accessibility headset system 108 determines, based on the first IR feedback and the set of initial LIDAR sensor measurements, a set of navigation instructions to direct the user to the first product by avoiding the one or more first obstacles. This is described in more detail in FIG. 6A. For instance, FIG. 6A shows a facility 600 (e.g., a storefront). The user 602 may seek to reach the product 604. However, there are multiple stationary obstacles 606, 608, 610, and 612 (e.g., store aisles). As such, the user 602, wearing the accessibility headset system 108, may provide a voice prompt to activate a beacon associated with the product 604. The accessibility headset system 108 may receive the set of initial LIDAR sensor measurements indicating the stationary obstacles 606-612 and the IR feedback from the beacon associated with the product 604. Based on this information, the accessibility headset system 108 may determine a set of navigation instructions 614-618 that directs the user to the product 604 and avoids the stationary obstacles 606-612.

In some instances, the accessibility headset system 108 may determine the set of navigation instructions based on a determined geo-fence of the user. For instance, the accessibility headset system 108 may include one or more wearable devices (e.g., wearable devices 312 and 314). Using the wearable devices 312 and 314, the accessibility system 108 may determine a geo-fence (e.g., a virtual perimeter) surrounding the user. The accessibility system 108 may determine the set of navigation instructions such that the geo-fence surrounding the user is not impacted by the first obstacles. For instance, the user may extend their arms at some point while moving towards the product 604. The geo-fencing may account for this extension such that even if the user extends their arms, the user does not interact with an obstacle. For example, FIG. 6A shows a simplified facility 600, but in operation, a facility may include a plurality of other users within each aisle. As such, the accessibility system 108 may take into account a determined geo-fence surrounding the user to provide navigation instructions that allows the user to avoid the other users while still moving towards the product 604. Additionally, and/or alternatively, as described above, the accessibility system 108 may update the geo-fence boundaries as the user is navigating the facility 600, and use the updated geo-fence boundaries to navigate the user around the facility 600.

At block 510, the accessibility headset system 108 provides, to the user 102, one or more first instructions from the set of navigation instructions using an output system of the accessibility headset system 108. The one or more first instructions are provided to the user 102 based on the indication of whether the user is visually impaired or hearing impaired. The output system may include a haptic device 428 and one or more second output devices. The second output devices may include, but is not limited to, a visual output device 424, an audio output device 426, and/or a conduction output device 430. For instance, based on the indication of whether the user is visually impaired or hearing impaired, the accessibility headset system 108 may determine which output device from the output system to use to provide the instructions. For example, if the user 102 is visually impaired, the accessibility headset system 108 may provide audio information indicating the instructions using the audio output device 426, haptic feedback indicating the instructions using the haptic device 428, and/or conductive information indicating the instructions using the conduction output device 430. In some instances, the accessibility headset system 108 may provide the instructions using only one output device (e.g., provide the instructions using the haptic device 428). In other instances, the accessibility headset system 108 may provide the instructions using multiple output devices (e.g., provide the instructions using the haptic device 428 and the audio output device 426). If the user 102 is audio impaired, the accessibility headset system 108 may provide visual information indicating the instructions using the visual output device 424, haptic feedback indicating the instructions using the haptic device 428, and/or conductive information indicating the instructions using the conduction output device 430. In some instances, the accessibility headset system 108 may provide the instructions using only one output device. In other instances, the accessibility headset system 108 may provide the instructions using multiple output devices.

At block 512, after outputting the one or more first instructions, the accessibility headset system 108 receives one or more sets of additional LIDAR sensor measurements indicating one or more additional obstacles surrounding the user. At block 514, the accessibility headset system 108 updates, based on the one or more sets of additional LIDAR sensor measurements, the set of navigation instructions to avoid the one or more additional obstacles surrounding the user. At block 516, the accessibility headset system 108 provides, to the user, one or more second instructions from the set of updated navigation instructions using the output system. The second instructions are provided to the user based on the indication of whether the user is visually impaired or hearing impaired.

FIG. 6B will describe blocks 512-516 in more detail. For instance, at block 510, the accessibility headset system 108 may provide a first instruction such as instruction 614 (e.g., for the user to move straight). However, the user 602 may encounter new obstacles (e.g., new obstacle 620) along the path to the product 604. As such, after moving along the path indicated by instruction 614, the accessibility headset system 108 may continuously receive LIDAR sensor measurements. At the position indicated by FIG. 6B, the accessibility headset system 108 may receive additional LIDAR sensor measurements indicating the new obstacle 620. Therefore, the accessibility headset system 108 updates the set of navigation instructions to avoid the new obstacle 620. For instance, the updated set of navigation instructions include instructions 622-626. The accessibility headset system 108 then provides the instructions 622-626 to the user 602.

In some variations, during the user 602 movement to the product 604, the user 602 may encounter an emergency situation and/or a dangerous situation. For instance, as mentioned previously, the accessibility headset system 108 may obtain audio information and/or other information (e.g., olfactory information from an olfactory sensor) indicating an emergency situation and/or a dangerous situation. The accessibility headset system 108 may use detection models (e.g., emergency detection models 418 such as ML-AI models) to determine whether to issue an alert. For instance, based on the olfactory information indicating a smell of petroleum and/or the audio information indicating a gunshot or other sound, the accessibility headset system 108 may provide an alert to the user 602 using the output system. The alert may be based on whether the user 602 is visually impaired or audio impaired. For example, the accessibility headset system 108 may provide an audio output, haptic feedback, visual output, and/or conduction output indicating the alert based on whether the user 602 is visually impaired or audio impaired.

In some examples, the accessibility headset system 108 may provide output to the user and/or another user indicating detected sign language. For example, the new obstacle 620 may be another user. The user 602 and the other user 620 may communicate with each other using sign language. The accessibility headset system 108 may detect the hand gestures using the LIDAR device 402 and/or other devices. The accessibility headset system 108 may process the hand gestures using translation models 420 to determine the sign language expressions. Subsequently, the accessibility headset system 108 may provide output indicating the determined sign language expressions. For instance, the accessibility headset system 108 may provide visual output (e.g., text) associated with the sign language expressions, vibrational signals associated with the sign language expressions, and/or audio associated with the sign language expressions. The output may be for the user 602 or the other user 620 (e.g., the user 602 may be providing the sign language and the accessibility headset system 108 may provide the output for the other user 620, and/or vice versa).

For instance, in some variations, when a user is using sign language in front of the accessibility headset system 108, the accessibility headset system 108 detects the hand gestures associated with the sign language and uses the translation models 420 to convert the hand gestures to sign language expressions. Then, based on whether the user is audio or visually impaired, the accessibility headset system 108 may provide a visual representation of the sign language expressions (e.g., text) and/or audio or conductive output indicating the sign language expressions.

In some instances, the LIDAR device 402 may be used to detect the hand gestures of the user 602 or the other user 620. The accessibility headset system 108 may use the translation models 420 to convert the hand gesture information (e.g., the LIDAR images) into sign language expressions. The accessibility headset system 108 may then output the sign language expressions as audio (e.g., speech), visual (e.g., text), and/or conductive output (e.g., using the conductive headphones).

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. An accessibility headset for visually impaired or hearing impaired users, comprising:
   one or more light detection and ranging (LIDAR) devices configured to obtain LIDAR measurements;
   one or more infrared (IR) sensors configured to obtain IR feedback from one or more products;
   an output system comprising:
      one or more haptic devices configured to provide haptic feedback to a user; and
      a second output device configured to provide alternative feedback to the user; and a processor configured to:
         receive an indication of whether the user is visually impaired or hearing impaired;
         receive, from the one or more IR sensors, first IR feedback indicating a location of a first product within a geographical area, wherein the first product is associated with a beacon that emits the first IR feedback;
         receive, from the one or more LIDAR devices, a set of initial LIDAR measurements indicating one or more first obstacles surrounding the user;
         determine, based on the first IR feedback and the set of initial LIDAR measurements, a set of navigation instructions to direct the user to the first product by avoiding the one or more first obstacles;
         provide, to the user, one or more first instructions from the set of navigation instructions using the output system, wherein the one or more first instructions are provided to the user using the output system based on the indication of whether the user is visually impaired or hearing impaired;
         after outputting the one or more first instructions, receive, from the one or more LIDAR devices, one or more sets of additional LIDAR measurements indicating one or more additional obstacles surrounding the user;

update, based on the one or more sets of additional LIDAR measurements, the set of navigation instructions to avoid the one or more additional obstacles surrounding the user; and provide, to the user, one or more second instructions from the set of updated navigation instructions using the output system and based on the indication of whether the user is visually impaired or hearing impaired, wherein the one or more second instructions are provided to the user using the output system based on the indication of whether the user is visually impaired or hearing impaired.

2. The accessibility headset of claim 1, further comprising:

an audio detection device configured to obtain one or more voice prompts from the user, and wherein the processor is configured to receive the indication of whether the user is visually impaired or hearing impaired based on the one or more obtained voice prompts.

3. The accessibility headset of claim 2, wherein the processor is further configured to:

provide, to the beacon associated with the first product, activation information based on the one or more voice prompts from the user, and wherein the beacon emits the first IR feedback in response to obtaining the activation information from the accessibility headset.

4. The accessibility headset of claim 2, wherein the audio detection device is further configured to obtain audio information from an environment surrounding the user, and wherein the processor is further configured to:

input the audio information into one or more emergency detection machine learning models to determine whether the audio information indicates an emergency; and based on the audio information indicating the emergency, providing, to the user, emergency information indicating the emergency using the output system.

5. The accessibility headset of claim 1, wherein the processor is further configured to:

obtain, from one or more wearable devices, geo-fencing information indicating a boundary around the user, and wherein the processor is configured to determine the set of navigation instructions to direct the user to the first product by avoiding the one or more first obstacles based on the geo-fencing information.

6. The accessibility headset of claim 5, wherein the processor is further configured to:

provide, to the one or more wearable devices, the one or more first instructions from the set of navigation instructions, wherein the one or more wearable devices are configured to provide haptic feedback to the user indicating the one or more first instructions, and provide, to the one or more wearable devices, the one or more second instructions from the set of updated navigation instructions, wherein the one or more wearable devices are configured to provide haptic feedback to the user indicating the one or more second instructions.

7. The accessibility headset of claim 1, wherein the processor is configured to provide the one or more first instructions by:

providing, using the one or more haptic devices, first haptic feedback indicating the one or more first instructions; and providing, using the second output device, first alternative feedback indicating the one or more first instructions, and wherein the processor is configured to provide the one or more second instructions by:

providing, using the one or more haptic devices, second haptic feedback indicating the one or more second instructions; and providing, using the second output device, second alternative feedback indicating the one or more second instructions.

8. The accessibility headset of claim 7, wherein the second output device comprises conduction headphones, wherein providing the first alternative feedback indicating the one or more first instructions comprises providing first vibrations to the user, and wherein providing the second alternative feedback indicating the one or more second instructions comprises providing second vibrations to the user.

9. The accessibility headset of claim 7, wherein the second output device comprises augmented reality (AR) glasses, wherein providing the first alternative feedback indicating the one or more first instructions comprises providing first prompts to the user using the AR glasses, and wherein providing the second alternative feedback indicating the one or more second instructions comprises providing second prompts to the user using the AR glasses.

10. The accessibility headset of claim 7, wherein the second output device comprises an audio output device, wherein providing the first alternative feedback indicating the one or more first instructions comprises providing first audio to the user using the audio output device, and wherein providing the second alternative feedback indicating the one or more second instructions comprises providing second audio to the user using the audio output device.

11. The accessibility headset of claim 1, further comprising:

one or more light sensors configured to obtain light measurements indicating ambient light around the user, and wherein the processor is further configured to:

provide, using the output system, an ambient light indication of the ambient light around the user.

12. The accessibility headset of claim 1, further comprising:

one or more sonar sensors configured to obtain sonar measurements, and wherein the processor is configured to determine the set of navigation instructions to direct the user to the first product based on the sonar measurements.

13. The accessibility headset of claim 1, wherein the processor is further configured to:

obtain, using the one or more LIDAR devices, a plurality of hand gesture LIDAR measurements;

determine, based on the plurality of hand gesture LIDAR measurements and one or more translation models, one or more sign language expressions; and output, using the output system, information indicating the one or more sign language expressions.

14. The accessibility headset of claim 13, wherein the processor is configured to output the information indicating the one or more sign language expressions by:

outputting, using the second output device, text associated with the one or more sign language expressions, wherein the second output device comprises augmented reality (AR) glasses.

15. The accessibility headset of claim 13, wherein the processor is configured to output the information indicating the one or more sign language expressions by:
  outputting, using the second output device, vibrational signals associated with the one or more sign language expressions, wherein the second output device comprises conduction headphones.

16. The accessibility headset of claim 13, wherein the processor is configured to output the information indicating the one or more sign language expressions by:
  outputting, using the second output device, audio associated with the one or more sign language expressions, wherein the second output device comprises an audio output device.

17. A method for using an accessibility headset for visually impaired or hearing impaired users, comprising:
  receiving, by the accessibility headset, an indication of whether a user is visually impaired or hearing impaired;
  receiving, by the accessibility headset and from one or more infrared (IR) sensors, first IR feedback indicating a location of a first product within a geographical area, wherein the first product is associated with a beacon that emits the first IR feedback;
  receiving, by the accessibility headset and from one or more light detection and ranging (LIDAR) devices, a set of initial LIDAR measurements indicating one or more first obstacles surrounding the user;
  determining, by the accessibility headset and based on the first IR feedback and the set of initial LIDAR measurements, a set of navigation instructions to direct the user to the first product by avoiding the one or more first obstacles;
  providing, by the accessibility headset and to the user, one or more first instructions from the set of navigation instructions using an output system, wherein the output system comprises one or more haptic devices configured to provide haptic feedback to the user and a second output device configured to provide alternative feedback to the user, and wherein the one or more first instructions are provided to the user using the output system based on the indication of whether the user is visually impaired or hearing impaired;
  after outputting the one or more first instructions, receiving, by the accessibility headset and from the one or more LIDAR devices, one or more sets of additional LIDAR measurements indicating one or more additional obstacles surrounding the user;
  updating, by the accessibility headset and based on the one or more sets of additional LIDAR measurements, the set of navigation instructions to avoid the one or more additional obstacles surrounding the user; and
  providing, by the accessibility headset and to the user, one or more second instructions from the set of updated navigation instructions using the output system and based on the indication of whether the user is visually impaired or hearing impaired, wherein the one or more second instructions are provided to the user using the output system based on the indication of whether the user is visually impaired or hearing impaired.

18. The method of claim 17, wherein the accessibility headset comprises an audio detection device, wherein the method further comprises:
  obtaining, using the audio detection device of the accessibility headset, one or more voice prompts from the user, and
  wherein receiving the indication of whether the user is visually impaired or hearing impaired is based on the one or more obtained voice prompts.

19. The method of claim 18, wherein the method further comprises:
  providing, by the accessibility headset and to the beacon associated with the first product, activation information based on the one or more voice prompts from the user, and
  wherein the beacon emits the first IR feedback in response to obtaining the activation information from the accessibility headset.

20. A non-transitory computer-readable medium having processor-executable instructions stored thereon, wherein the processor-executable instructions, when executed, facilitate:
  receiving an indication of whether a user is visually impaired or hearing impaired;
  receiving, from one or more infrared (IR) sensors, first IR feedback indicating a location of a first product within a geographical area, wherein the first product is associated with a beacon that emits the first IR feedback;
  receiving, from one or more light detection and ranging (LIDAR) devices, a set of initial LIDAR measurements indicating one or more first obstacles surrounding the user;
  determining, based on the first IR feedback and the set of initial LIDAR measurements, a set of navigation instructions to direct the user to the first product by avoiding the one or more first obstacles;
  providing, to the user, one or more first instructions from the set of navigation instructions using an output system, wherein the output system comprises one or more haptic devices configured to provide haptic feedback to the user and a second output device configured to provide alternative feedback to the user, and wherein the one or more first instructions are provided to the user using the output system based on the indication of whether the user is visually impaired or hearing impaired;
  after outputting the one or more first instructions, receiving, from the one or more LIDAR devices, one or more sets of additional LIDAR measurements indicating one or more additional obstacles surrounding the user;
  updating, based on the one or more sets of additional LIDAR measurements, the set of navigation instructions to avoid the one or more additional obstacles surrounding the user; and
  providing, to the user, one or more second instructions from the set of updated navigation instructions using the output system and based on the indication of whether the user is visually impaired or hearing impaired, wherein the one or more second instructions are provided to the user using the output system based on the indication of whether the user is visually impaired or hearing impaired.

* * * * *